INVENTORS
WILLIAM L. BERNER
CHARLES P. MULCAHEY
RANSOM P. SKINNER

BY Eugene C. Trautlein

ATTORNEY

INVENTORS
WILLIAM L. BERNER
CHARLES P. MULCAHEY
RANSOM P. SKINNER

BY Eugene C. Trautlein
ATTORNEY

INVENTORS
WILLIAM L. BERNER
CHARLES P. MULCAHEY
RANSOM P. SKINNER

BY Eugene C. Brantley
ATTORNEY

United States Patent Office 3,289,423
Patented Dec. 6, 1966

3,289,423
LOAD SUPPORT MEANS FOR THERMALLY INSULATED CONTAINERS
William L. Berner and Charles P. Mulcahey, Indianapolis, Ind., and Ransom P. Skinner, Tonawanda, N.Y., assignors to Union Carbide Corporation, a corporation of New York
Continuation of application Ser. No. 340,311, Jan. 27, 1964. This application Nov. 30, 1965, Ser. No. 532,818
11 Claims. (Cl. 62—45)

This invention relates to thermally insulated containers and in particular to insulated containers having improved support means. This application is a continuation of Serial No. 340,311 filed January 27, 1964 in the names of W. L. Berner et al, now abandoned.

Materials to be stored at low temperatures are often stored in double-walled containers having a compression-sensitive thermal insulating material (i.e. an insulating material whose thermal conductivity increases when the material is compressed with the resulting impairment in its insulating properties) in an evacuable space between the walls. Due to the atmospheric load on the walls of such double-walled containers, there is a tendency for the walls to be forced against the insulation, thereby compressing the insulation and in turn impairing the insulating properties of the insulation. For example, diatomaceous earth (a compression-sensitive insulating material) exhibits, in a high vacuum, a thermal conductivity of about $0.5 \times 10^{-3}$ B.t.u./hr./ft./°F. when not compressed but, when under a uniform compression of about 15 lbs./sq. in., exhibits a thermal conductivity about eight times higher, i.e. approximately $4.0 \times 10^{-3}$ B.t.u./hr./ft./°F. In order to circumvent such undesirable compression of compression-sensitive insulating material, it has been suggested that internal bracing means can be provided between the walls of the containers to support the atmospheric load on the walls. By way of illustration, it has been suggested that solid cylindrical columns be employed as the bracing means. However, the solid cylindrical columns proposed to date have been unsatisfactory in that they provide a path for excessive heat leak into the containers by conduction because relatively thick columns having a relatively large area in contact with the outer wall of the container are required to prevent buckling of the columns. As a further illustration, it has been suggested that bracing means be employed (e.g. glass spheres or hollow cylindrical columns) which provide a limited area of contact with the outer wall. However, such spherical bracing means have not proved satisfactory since they entail a highly concentrated loading at the points of contact between the spheres and the walls with resulting deformation of adjacent unsupported portions of the walls. Such deformation causes an increase in the area of contact between the bracing means and the wall and, therefore, causes an increase in the heat leak through the bracing means. The use of hollow cylindrical columns as bracing means suffers from the disadvantage that, when such bracing means are subjected to substantial overloads, especially in the form of localized impacts due to blows, etc., they fail completely.

It is an object of this invention to provide double-walled containers provided with bracing means between the walls which minimizes the compression of compression-sensitive insulating material without providing a path for excessive heat leak into the container.

Still another object of this invention is to provide double-walled containers of the above-described type provided with bracing means which are not prone to complete failure when overloaded.

Other objects and advantages of this invention will be apparent from the ensuing disclosure and the appended claims.

This invention is based on the discovery that the atmospheric load, as well as other loads, on double-walled containers insulated with compression-sensitive insulating material provided in an evacuated space between the walls can be efficiently supported by a novel load-supporting means disposed in the evacuable space. Such load-supporting means consists essentially of glass fiber material in load-transmitting contact with both the inner surface of the outer wall and outer surface of the inner wall. The longitudinal axes of the fibers in these load supporting means are disposed perpendicular to the direction of heat leak into the containers. These novel load-supporting means transmit the loads on one surface to the other surface, thereby minimizing compression of the insulated material due to such loads. Moreover, such load-supporting means do not provide a path for excessive heat leak through the container by conduction through load-supporting means. In addition, such load-supporting means, when overloaded, tend to become compressed rather than failing completely and hence support at least a portion of the load though overloaded. Although the walls of the insulated containers of this invention may deform due to atmospheric loads and thereby increase the area of contact between the walls and the load support means, excessive heat leak into the container does not result. Such is the case since the low thermal conductivity of the load support means is not due primarily to a limited area of contact between the walls and the bracing means, but rather, is due primarily to internal resistance to heat flow within the load support means. This internal resistance to heat flow in the load support means is in turn due to the low thermal conductivity of the glass fibers therein when disposed perpendicular to the direction of heat leak into the container.

A critical feature of the insulated containers of this invention is the load-supporting means employed therein. These load-supporting means consist essentially of glass fiber material. The longitudinal axes of the fibers in these load-supporting means are disposed perpendicular to the direction of heat leak through the evacuable space which, in the load-supporting pegs employed in the embodiment of the invention depicted in FIGURE 1, corresponds to their disposition perpendicular to the longitudinal axis of the pegs. This orientation of the fibers is important in minimizing heat leak through the load-support means by conduction through the fibers. It is highly desirable that the diameter of the fibers employed be in the range of from 0.1 micron to 100 microns with a fiber diameter from 0.20 micron to 12 microns being especially preferred. Preferably, the thickness of each sheet of fiber glass material should be from 0.002 to 0.25 inch for ease of fabrication.

Figure 1:
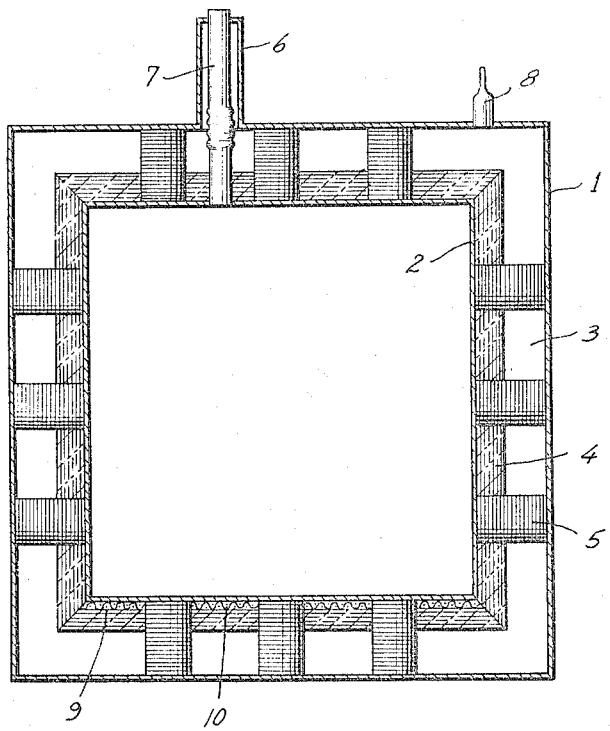
FIGURE 1 is a front elevation view in section of an insulated container of this invention.

Referring now more specifically to the drawings, FIGURE 1 is an insulated container of the present invention having an outer wall or shell 1 and an inner wall or storage compartment 2 enclosed by and spaced from the outer shell 1 so as to define an intervening evacuable space 3 in which is provided a compression-sensitive insulating material 4. Cylindrical load-supporting means or pegs 5 are disposed in an evacuable space and pass through the insulating material 4 which is provided with circular holes for this purpose. (Square pegs can also be used to advantage.) In the embodiment shown in FIGURE 1, the load-supporting pegs 5 are composed of a plurality of disc-shaped sheets of glass fiber material in superimposed relation with one another so as to define a solid cylindrical support means which is in load-transmitting contact with both the inner surface of outer shell 1 and the outer surface of compartment 2 so as to transmit the load on one surface to the other surface, thereby minimizing compression of insulating material 4 due to such loads. The longitudinal axes of the fibers in the sheets of glass fiber material which constitute load-supporting pegs 5 are disposed perpendicular to the longitudinal axis of the pegs and hence normal to the direction of heat leak into the container. The container is provided with cylindrical projection 6 of outer shell 1 within which is concentrically situated filling conduit or tube 7 joined at one end to projection 6 and at the other end to inner storage compartment 2 in a gas-tight manner to prevent passage of air from the atmosphere into evacuable space 3. Filling tube 7 allows for the introduction of materials to be stored into the container (e.g. liquid nitrogen). When the container is employed to store materials at low temperatures, a conventional low heat conducting plug or other sealing means can be inserted in fill tube 7 in order to minimize heat leak into the container through filling tube 7. The container is provided with a vacuum seal-off fitting or pinch-off tube 8 which can be connected to an evacuating means for creating a vacuum in evacuable space 3 when desired. Screen 9 is attached to the outer surface of inner compartment 2 in such a manner as to provide a pocket for retaining a mass of a zeolitic molecular sieve gas adsorbent 10 in gaseous communication with the evacuable space 3 so as to help maintain the vacuum in evacuable space 3 after a subatmospheric pressure has been produced therein.

The novel load-support means employed in the insulated containers of this invention can be provided in any suitable configuration. By way of illustration, the load-support means can be in the form of solid cylindrical pegs as depicted in FIGURE 1. (Alternately, square pegs produced from thin squares of fibers can be produced and used to advantage in the same way as cylindrical pegs.) In such cylindrical pegs the discs of fibrous glass material can be stabilized in a desired configuration during fabrication of a container and during use therein by any appropriate means such as by stacking the discs in a fabric (e.g. nylon or cotton) cylinder or sock. The fabric socks also restrain the fibers from squeezing outward under load and thereby failing. Stabilization can also be achieved by gluing the discs together with a minor amount of a suitable adhesive. Suitable adhesives include epoxy resins, phenolic resins and the like. It is important that such adhesives are present in only a minor amount since major amounts of adhesives provide a continuous path for heat leak through the pegs. Accordingly, the pegs should contain no more than 40 weight-percent and preferably no more than 25 weight-percent of an adhesive. When a fabric cylinder or sock is used to stabilize the glass fibrous material, a rigid disc of plastic or other suitable material may be inserted at either end to provide flat surfaces to contact the outer shell and the inner compartment. Such cylinders or socks can also be used to precompress the discs. Suitable pegs can also be produced by compressing thick mats or bats of glass fibers in the presence of no more than 40 weight-percent (preferably no more than 25 weight-percent) of a suitable adhesive (e.g. an epoxy resin adhesive) and then curing the adhesive to bond the fibers together to produce a one-inch thick board. Thereupon, one-inch pegs can be cut or punched out of the board and as many of such pegs as are necessary can be glued together (e.g. with a rubber base cement) to produce a composite peg of the desired length.

Once positioned in an evacuated space in a container of this invention, the pegs are stabilized against movement by the loads on the surfaces with which they are in contact, particularly by the atmospheric load on the walls of the container. The number and the dimensions of the pegs employed can be adapted to the particular container and so, for example, where the pegs are employed in the container having walls of either aluminum or stainless steel spaced from 0.25 to 2 inches apart and having wall thicknesses from 0.001 to 0.25 inch, the pegs preferably have a diameter from 0.25 to 3 inches with a spacing between the pegs of from 3 to 16 inches from center to center. Such pegs are preferably cylindrical although pegs of square or rectangular cross section can be employed. It is highly desirable that the pegs have a density from 20 lbs./cu. ft. to 80 lbs./cu. ft. inclusive when loaded in order to insure good performance in the containers of this invention. Pegs having greater densities have excessive thermal conductivities whereas pegs having lower densities have load carrying capacities which are too low. A peg density of about 40 lbs./cu. ft. is particularly desirable from the point of view of achieving both low thermal conductivity and excellent load carrying capacity. In fabricating a container of this invention it is often convenient to fasten the pegs to one wall by means of an adhesive for ease of maintaining the pegs in a desired position. Such solid pegs (e.g. cylindrical or square pegs) are generally the preferred load-supporting means of this invention in view of their high load carrying capacities, low heat leak and ease of fabrication.

Figure 6:
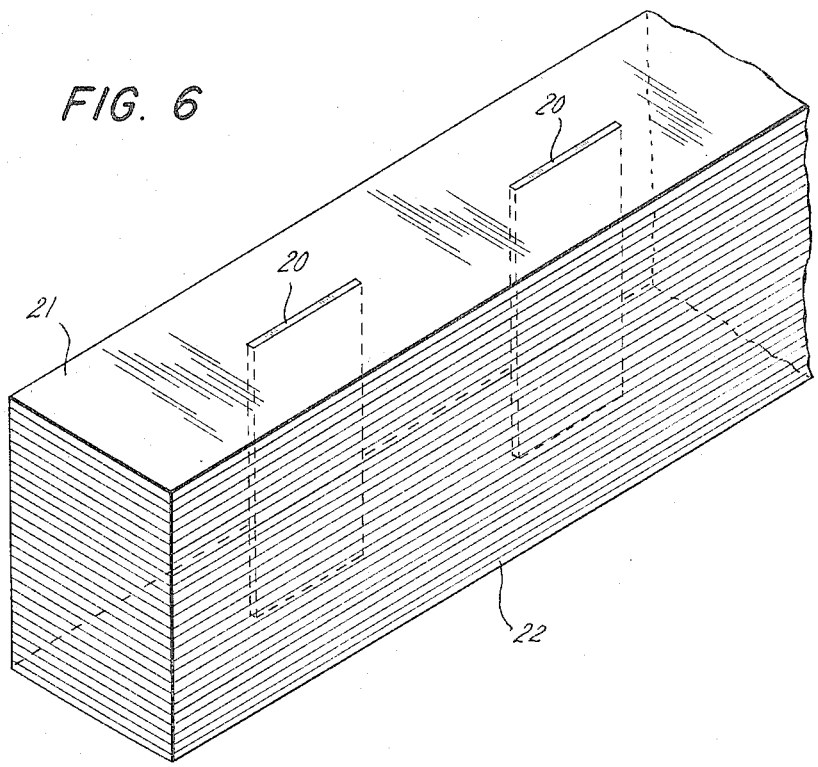
FIGURE 6 is an isometric view of one type of novel bracing means for insulated containers contemplated by this invention.

Illustrative of another configuration of the novel load-support means employed in the insulated containers of this invention is the strip or bar type configuration depicted in FIGURE 6. The load-support bar of FIGURE 6 consists essentially of rectangular sheets of fibrous material in superimposed relation with each other. The sheets in the bar can be precompressed and stabilized against relative movement during fabrication of the insulated container by tying or sewing the sheets together by any suitable means as, for example, by interlacing the sheets with thread or cord 20. Alternatively, the sheets of fibrous material in the bar-support means of FIGURE 6 can, as in the case of the above-described pegs, be stabilized during fabrication of the insulated container by employing a minor amount of adhesive between the sheets of fibrous material. When the bar depicted in FIGURE 6 is employed in an insulated container of this invention, it is disposed in the evacuable space of the container so that surface 21 is in contact with the inner or the outer wall and surface 22 is in contact with the other wall to insure that the fibers in the sheets of fibrous material are disposed perpendicular to the direction of heat leak into the container. The dimensions of such bar-support means can be adapted to the requirements of the insulated container in which they are employed and so, for example, in a double-walled container having aluminum or stainless steel walls spaced from 0.5 to 4 inches apart and having a wall thickness from 0.001 to 0.25 inch, the bars can be from 0.25 to 6 inches wide and can be spaced from 3 to 16 inches from center to center. When the insulating material employed is in the form of sheets, the insulation sheets can be sectioned to accommodate the bars. In this respect, the bar support means offer an advantage over the peg support means which must be positioned through a plurality of corresponding holes in such sheets.

Figure 7:
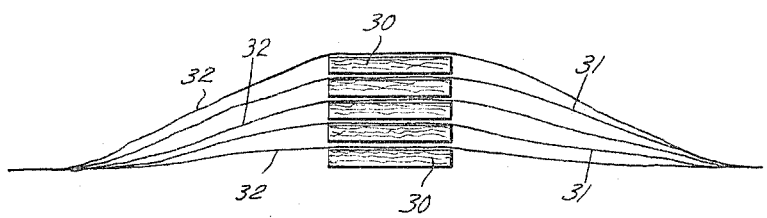
FIGURE 7 is a sectional view of another type of novel bracing means for insulated containers contemplated by this invention.

Illustrative of yet another configuration of the novel load-support means employed is the alternating load-support-insulation layer configuration depicted in FIGURE 7. FIGURE 7 shows a configuration where narrow layers 30 composed of one or more narrow sheets of fiber glass material are disposed in alternating sequence between the layers of a composite insulating material which in turn is composed of alternating sheets of a metallic radiant heat reflecting component 31 and a glass fiber low heat conducting component 32. As is apparent, the thickness of the alternating load support-insulation layer configuration will be greater than the thickness of the adjacent portion of the insulation and hence the alternating load-support insulation layer configuration will support any load on the walls of the container and the adjacent insulation will not be subjected to such loads. This latter configuration can readily be achieved during the wrapping of the inner wall of the container with the composite insulating material by concurrently applying strips of fibrous load-supporting material to the inner wall. Although the insulating properties of the insulating material sandwiched between the load-supporting material in this configuration is impaired somewhat by the compression to which it is subjected due to the loads on the container walls, only a relatively small amount of insulating material is so effected. The load supporting means of FIGURE 7 provides the additional advantage of not requiring pre-fabrication in any particular shape (e.g. as pegs or bars) and also serves to support the composite insulating material which need not be provided with holes or sectioned to accommodate this load-supporting means. Any desired sequence of layers of the various materials can be employed in the load-supporting means of FIGURE 7. In addition to the sequence shown, several successive layers, each composed of one or more sheets of the glass fiber material 30, can be interposed between each pair of layers 31 and 32 of the composite insulating material or one layer of glass fiber material 30 can be interposed between several pairs of layers 31 and 32 of the composite insulating material.

The insulated containers of this invention are conveniently fabricated from panels composed of outer panel walls which, taken together, form the outer wall or outer shell of the container and inner panel walls which, taken together, form the inner storage compartment of the container. In such panels, the load-supporting means of this invention traverse the space between the panel walls and are in load-supporting contact therewith. The space between panel walls also contains a compression-sensitive insulating material and, if desired, a gas adsorbent material in gaseous communication with the space. Thus, getter materials (e.g. palladium oxide or barium metal) can be present in this space for gas adsorption near ambient temperatures and crystalline zeolitic molecular sieves can be present for gas adsorption at low temperatures. Such panels are illustrated by FIGURE 2 described below.

Figure 2:
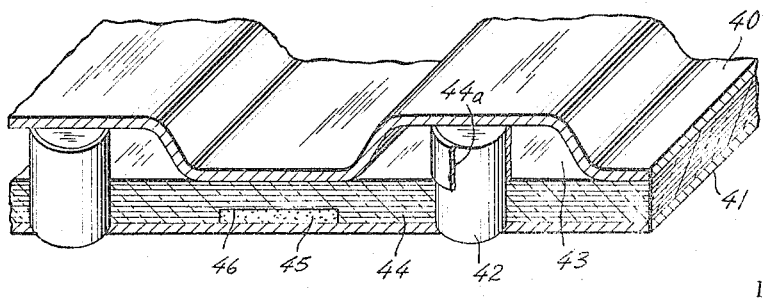
FIGURE 2 is an isometric view of a panel suitable for use in fabricating the insulated containers of the present invention.

FIGURE 2 depicts a panel suitable for use in fabricating the insulated containers of the present invention. The panels shown in FIGURE 2 are composed of outer panel wall 40 and inner panel wall 41 maintained in spaced relation with one another by a plurality of load-supporting pegs 42 so as to provide an intervening space 43. Located in intervening space 43 is compression-sensitive insulating material 44 provided with holes to accommodate pegs 42. Also located in intervening space 43 is a mass of a gas adsorbent 45 retained within a perforated metallic blister 46, which perforations provide gaseous communication between the adsorbent 45 and space 43. In the preferred panel depicted in FIGURE 2, outer panel wall 40 is corrugated and the load-support pegs 42 are arranged in parallel rows with one end of each peg in contact with the corrugated portion of outer panel wall 40. This arrangement of the corrugated outer panel wall 40 and load-supporting pegs 42 provides for a relatively long heat path through pegs 42 for a given overall wall thickness and provides for a rigid wall without resort to scantlings. Such scantlings are normally riveted to the wall and the rivets are a source of leakage. The lateral surface area of pegs 42 in the arc of the corrugations is covered with an insulating material 44a containing a radiant heat reflecting component so as to minimize the radiation of heat from the corrugated surface of outer panel wall 40 to the pegs 42. Load-supporting pegs 42 are conveniently covered with insulating materials 44a by wrapping sheets of such material about the longitudinal axis of the pegs 42. Although the illustrative panel depicted in FIGURE 2 is shown as having corrugated outer panel walls 40 and flat inner panel walls 41, it should be recognized that either or both walls of such panels can be corrugated or both walls can be flat as desired for a particular application. The particular dimensions of the corrugations and their spacings can be carried to suit the particular application in view. By way of illustration, when the insulated container is intended to be a commercial truck body having outer dimensions of 15 feet in length, 8 feet in height and 8 feet in width, the corrugated outer panel wall can be 2.5 inches in overall thickness having about 1.5 corrugations per foot, each corrugation being about 1.5 inches high, 4.7 inches wide across the inner surface and 3.25 inches wide across the outer surface. When the outer panel wall 40 is flat, the pegs are in direct contact with the outer panel wall. Where scantlings of conventional design welded to the inner surface of the outer panel wall are used, the pegs are located between the scantlings. A panel of the type shown in FIGURE 2 in which the glass fiber material was in the form of pegs stabilized during fabrication and use in a fabric sock was found to have a thermal conductivity of $30 \times 10^{-5}$ B.t.u./hr./ft./° F. When the bracing means was in the form of pegs stabilized with glue or in the form of bars stabilized by sewing the sheets of glass fiber material, the thermal conductivity was $35 \times 10^{-5}$ B.t.u./hr./ft./° F.

The compression-sensitive insulating materials employed in the containers of this invention include composite insulating materials hereinafter more fully described. Such composite insulation comprises a radiant heat reflecting (i.e. radiation-impervious) component and a low heat conducting component located in the space between the outer shell and the inner compartment. This space is maintained at a pressure less than 1 micron (preferably at a pressure less than 0.1 micron) when the container is in use. These low operating pressures are attained initially by conventional means and are preferably maintained by the gas absorbents described below. The components in the composite insulation used in this invention cooperate to minimize the total heat leak into the inner vessel by radiation and conduction. The thermal conductivity of this insulation is preferably no greater than about $3.2 \times 10^{-5}$ B.t.u. per hour, ° F., square foot per foot.

The components of the composite insulation employed in the container of this invention can be in the form of particles (i.e. powder) or in the form of sheets and the components can be composed of any of a wide variety of materials. By way of illustration, suitable radiant heat reflecting components include particulate metals, metal oxides or metal-coated materials (e.g. particulate copper paint pigments, aluminum paint pigments, magnesium oxide, zinc oxide, iron oxide, titanium dioxide, carbon black above 10 microns in size, copper-coated mica flakes and graphite) having particle sizes less than about 500 microns (preferably less than 50 microns). Suitable low heat conducting components include particulate silica, silicates (e.g. perlite), alumina, magnesia having particle sizes less than 420 microns (preferably less than 75 microns) and carbon black having particle sizes less than 0.1 micron. As further illustrated, suitable radiant heat reflecting components in sheet form include thin metal foil, such as aluminum, tin, silver, gold, copper and cadmium foil preferably having a thickness between 0.2 millimeter and 0.002 millimeter. Suitable low heat conducting components in sheet form include plastic sheets (e.g. polyethylene terephthalate and polytetrafluoroethylene sheets) and fibrous sheets (e.g. glass fiber paper or web sheets), and are preferably composed of fibers having fiber glass diameters of less than 50 microns or more preferably of less than 10 microns. Insulation components in the form of sheets are disposed so that the sheets are substantially parallel to each other and substantially perpendicular to the direction of heat flow across the evacuable space between the outer shell and the inner compartment or vessel.

The radiant heat reflecting component and the low heat conducting component used in the composite insulation employed in the insulated containers of this invention are so disposed in relation to each other that the latter component prevents transmission of heat across the evacuable space by conduction through the former component. By way of illustration, when both insulating components are in the form of sheets, they are arranged as alternating sequence. In the latter embodiment, the low heat conducting component sheets can serve as a spacing and supporting means for the radiant heat reflecting component sheets. As a further illustration, when both insulating components are in the form of particles (as in the insulation disclosed in U.S. Patent 2,967,152), the radiant heat reflecting component particles are dispersed in a matrix of the low heat conducting components particles. In the latter embodiment, the radiant heat reflecting component particles can constitute from 1% to 80% by weight of the total weight of both component particles.

Insulation materials suitable for use in the containers of this invention are disclosed in U.S. Patents Nos. 3,007,596; 3,018,016; 3,007,576; 3,009,600; and 3,009,601.

The containers of this invention preferably contain a gas absorbent that is in vapor communication with the evacuable space between the outer shell and the inner compartment or vessel. The absorbent can be held in a perforated disc or blister or in a wire screen or glass cloth attached to the outer surface of the inner vessel. Such absorbents assist in maintaining a vacuum in the evacuable space. Particularly suitable gas absorbents which can be placed between the outer shell and the inner vessel in the insulation containers of this invention are crystalline zeolitic molecular sieves such as Zeolite A and Zeolite X.

The insulating containers of this invention can be provided in a variety of sizes and shapes and equipped internally and externally with a variety of ancillary equipment depending upon the particular use contemplated. Such uses include use as fixed insulated perishable food containers for the home, restaurants or warehouses. In the latter areas of use, the container can be fitted with shelves for holding the food and employed in combination with refrigerating means such as conventional mechanical refrigerating means. In addition, the insulated containers of this invention can be employed for storing and shipping liquefied refrigerant gases such as nitrogen in which case the containers can be equipped with filling conduits, filling control devices, pressure relief valves and the like. Moreover, containers of this invention can be employed in combination with refrigerating means arranged within or outside the containers suitably designed for shipping perishable materials, particularly perishable foods, by truck, rail or ship. An insulated container of the latter type is depicted in FIGURE 3 as described below.

Figure 3:
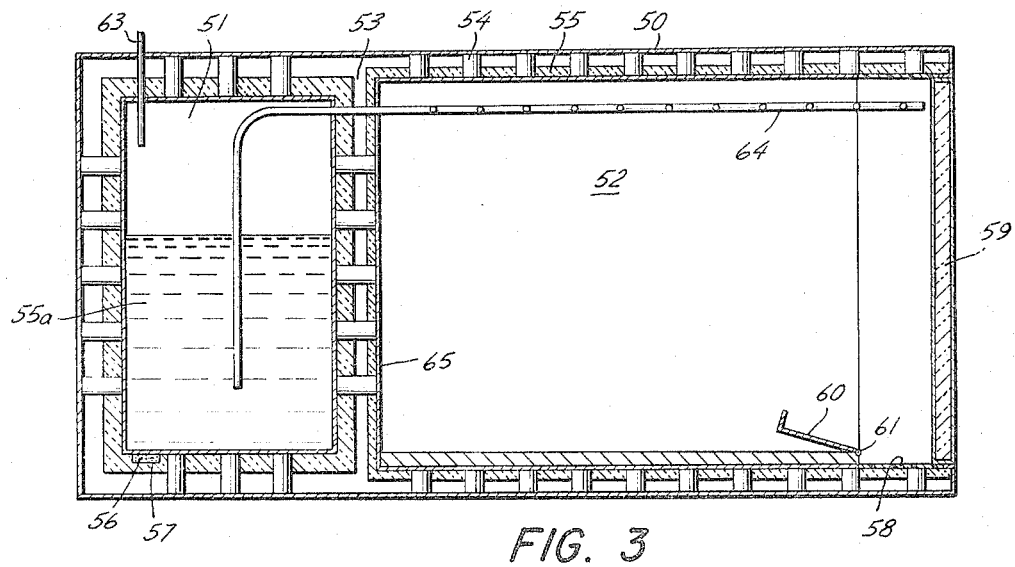
FIGURE 3 is a longitudinal view, partly in section, of an insulated container of this invention wherein the outer wall encloses both a liquefied refrigerant gas compartment and a perishable food storage compartment.
Figure 5:
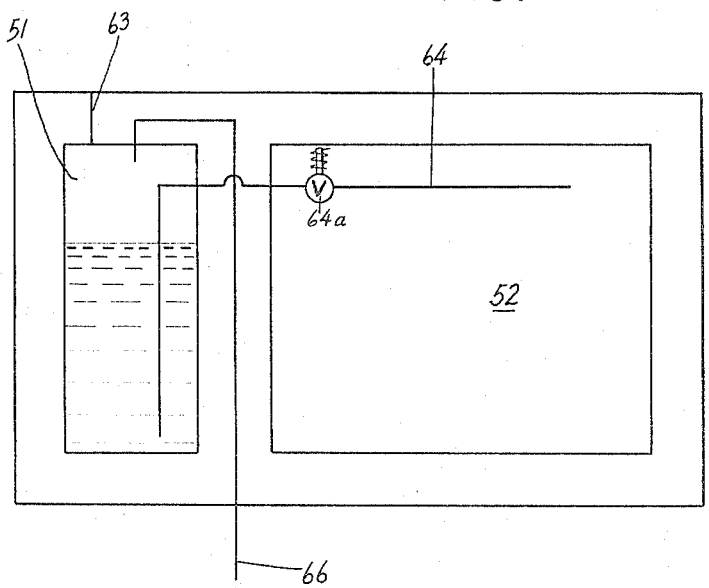
FIGURE 5 is a schematic diagram of various conducts and related features that can be employed in a modification of the container of FIGURE 3.

FIGURE 3 depicts an insulated container of this invention having an outer shell 50 within which are located two separate compartments, liquefied gas storage compartment 51 and perishable food storage compartment 52. Outer shell 50 and compartments 51 and 52 can be composed of any suitable material such as stainless steel or aluminum. The outer surfaces of liquefied gas storage compartment 51 and perishable food storage compartment 52 together with the inner surface of outer shell 50 define an intervening evacuable space 53. Evacuable space 53 also extends between the adjacent walls of liquefied gas storage compartment 51 and perishable food storage compartment 52. A plurality of solid cylindrical load-supporting pegs 54 of the type described above are disposed in evacuable space 53 between the liquefied gas storage compartment 51 and the adjacent portion of the outer shell 50 so as to support the atmospheric load on the outer shell. Those pegs are disposed between the bottom surfaces of the compartments 51 and 52 and the outer shell 50 so as to also support the weight of compartments 51 and 52. Additionally, pegs 54 are disposed between liquefied gas storage compartment 51 and perishable food storage compartment 52 in order to maintain these compartments at a distance from each other equal to the length of the pegs so as to stabilize the compartments against relative movement and prevent thermal contact between the walls of the compartments. Compression-sensitive insulating material 55 is disposed in the evacuable space 53 around compartments 51 and 52 so as to minimize the heat leak from outside the outer shell 50 into the compartments 51 and 52 and to minimize heat leak from perishable food storage compartment 52 to liquefied gas storage compartment 51. Inasmuch as the temperature difference between a liquefied gas storage compartment 51 and the surfaces surrounding it is much greater than the temperature difference between perishable food storage compartment 52 and the surfaces surrounding it, the thickness of the insulating material 55 around liquefied gas storage compartment 51 may be, as shown in FIGURE 5, greater than the thickness of insulating material 55 around perishable food storage compartment 52. Insulating material 55 is provided with holes through which pass pegs 54. A liquefied refrigerant gas 55a (such as liquid nitrogen) is provided in liquefied gas storage compartment 51 and this liquefied gas 55a is in thermal communication with a mass of a zeolitic molecular sieve gas adsorbent 56 which is retained in a perforated metal blister 57 depending from the bottom of liquefied gas storage compartment 51. The liquefied gas 55 cools the molecular sieve 56 thereby further improving the gas adsorbing properties of the sieve. The perforations in the blister 57 provide gaseous communication between the zeolitic molecular sieve gas adsorbent 56 and evacuable space 53 and serves to maintain a vacuum in the evacuable space after the evacuable space is evacuated. Strips of gas-impervious organic polymer 58 having low thermal conductivity join the top, bottom and side walls of perishable food storage compartment 52 to outer wall 50. These strips of organic polymer 58 serve to prevent the passage of gas into evacuable space 53 and serve to prevent heat leak into perishable food storage compartment 52 while at the same time defining an access conduit for introducing food into perishable food storage compartment 52. Insulated storage compartment door 59 provides access to perishable food storage compartment 52. Door 59 can be insulated with polyurethane foam or other suitable insulating material. Alternately, the desired degree of insulation can be achieved by using a vacuum panel door. The floor of perishable food storage compartment 52 is provided with cover plate 60 rotatable about hinge 61 which can be positioned over the strip of organic polymer 58 connecting the floor of compartment 52 to outer shell 50. Cover plate 60 prevents damage to the strip of organic polymer 58 when perishable food is being introduced into perishable food storage compartment 52. In order to minimize heat leak into compartment 52 through cover plate 60, cover plate 60 is hinged so that it can be rotated into the position shown in FIGURE 3 when not needed to protect lower strip of organic polymer 58. Low heat conducting filling tube 63 is provided for introducing liquefied gas 55a into liquefied gas storage compartment 51 and transfer conduit 64 is provided for transporting liquefied gas 55a from liquefied gas storage compartment 51 to perishable food storage compartment 52 in order to provide refrigeration for perishable food stored in perishable food storage compartment 52. Perforations are provided in the portion of the transfer conduit 64 located within perishable food storage compartment 52 to allow the liquefied gas 55 to be sprayed from the transfer conduit 64 as a fine mist on the perishable food within perishable food storage compartment 52. Suitable means are provided for regulating the flow of liquefied gas 55a into perishable food storage compartment 52 so as to maintain the perishable food at a predetermined desired temperature. The temperature in compartment 52 will be dependent on the type food being stored and will usually be between −40° F. and +60° F. Such flow regulating means include the feature of discontinuing the transfer of the liquefied gas into perishable food storage compartment 52 when insulated storage compartment door 59 is opened. This latter feature prevents a waste of the liquefied gas when the insulated storage compartment door 59 is opened to introduce perishable food into perishable food storage compartment 52 or to withdraw the food.

The pressure required to transfer the liquefied gas 55a from liquefied gas storage compartment 51 through transfer conduit 54 in which perishable food storage compartment 52 can be created in any convenient manner. Thus, the pressure can be created by a heating coil in the bottom of liquefied storage compartment 51 which creates the desired pressure by vaporizing a portion of the liquefied gas 55a in response to a temperature sensing element in perishable food storage compartment 52. Preferably, the pressure is created initially by charging the liquefied gas to the liquefied gas storage compartment 51 along with vapor of the gas at a pressure sufficient to insure the transfer of the gas during the desired period of operation. Preferably, a pressure from 5 p.s.i.g. to 25 p.s.i.g. is maintained in compartment 51.

Liquefied gas storage compartment 51 is preferably provided with internal bracing means or supports to assist in carrying loads imposed on compartment 51.

It is desirable to provide for the expansion and contraction of the outer shell 50 and the perishable food storage compartment 52 of the insulated container of FIGURE 3. The expansion and contraction of the outer shell 50 is readily provided for by employing corrugated walls as in FIGURE 2. The expansion and contraction of perishable food storage compartment 52 can be provided for by constructing wall 65 of relatively thin and resilient material so that it will tend to buckle under stress (e.g. a 7.5 ft. x 7.5 ft. wall can be made 0.100 inch thick for this purpose). Alternately, the expansion and contraction of perishable food storage compartment 52 can be provided for by employing an elastic material also possessing low thermal conductivity and gas impervious properties as organic polymer strip 58. In the latter case, wall 65 can be made thicker and, therefore, more rigid (e.g. a 7.5 ft. x 7.5 ft. wall can be made 0.50 inch thick for this purpose). Organic polymer strips suitable for this use include those composed of butyl rubber.

Figure 4:
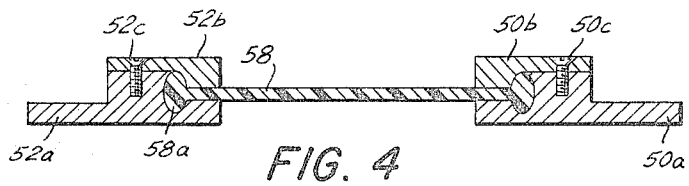
FIGURE 4 is a sectional view of a fastening member employed in the embodiment of FIGURE 3 to fasten perishable food storage compartment to the outer wall and to provide an access conduit.

The manner in which the strips of organic polymer 58 are attached to the walls of perishable food storage compartment 52 and outer shell 50 is illustrated by FIGURE 4. In FIGURE 4, the strip of organic polymer 58 is provided with enlarged end portions 58a which are adapted to fit into bracket 52a attached to the floor of inner compartment 52 and into bracket 50a attached to outer shell 50. Enlarged end portions 58a of organic polymer strip 58 are maintained in brackets 52a and 50a by plates 52b and 50b held in place by means of screws 52c and 50c.

FIGURE 5 illustrates a flow diagram of a system for transferring a cryogenic liquid from storage compartment 51 of FIGURE 3 to storage compartment 52 of FIGURE 3 in order to refrigerate the contents of compartment 52. Compartment 51 is filled with a cryogenic liquid through conduit 63 and then the interior of compartment 51 is pressurized by conventional means to a pressure of about 5 p.s.i.g. to 25 p.s.i.g. Conduit 66 is provided with a relief valve and safety valve (not shown). Conduit 64 is provided with a solenoid valve 64a which is connected to a suitable temperature controller (not shown). When the temperature in compartment 52 arises above a predetermined point, the controller energizes a solenoid 64a to open it. The cryogenic liquid then flows from compartment 51 into compartment 52 through conduit 64 because of the pressure differential (compartment 52 is at about atmospheric pressure). The cryogenic liquid is sprayed into compartment 52 through perforations in conduit 64 until the temperature in compartment 52 decreases to the predetermined point. At the latter point, solenoid valve 64a closes, terminating the flow of the cryogenic liquid.

It is apparent that the load supporting means of this invention are particularly applicable to insulated containers having walls which, in the absence of the load supporting means, would tend to deform under loads (especially under atmospheric loads) so as to compress the insulating material. It is also apparent that the load supporting means of this invention are in contact with only a minor portion of the surfaces that define the evacuable space (e.g. from 1 to 5 percent of the area of each surface is in contact with the load support means). This limited contact between the walls and the support means minimizes heat leak. Despite this limited area of contact, adequate support for the walls is provided.

It should be recognized that not every glass fiber in the support means of this invention will necessarily have the above-described orientation perpendicular to the direction of heat leak. A minor amount of fibers not having this orientation can be tolerated, provided that the majority of the fibers have the desired orientation.

It should also be recognized that the load supporting means of this invention can also be employed in containers for storing materials at temperatures higher than those of the surrounding atmosphere. Thus, containers having such load support means and provided with internal heating means can be used in arctic climates to store materials at higher than ambient temperatures. Thus, these load supporting means are generally useful in containers for storing materials at other than ambient temperatures.

What is claimed is:

1. An insulated container for storing materials at other than ambient temperatures comprising in combination an outer shell; an inner storage compartment enclosed by and spaced from the outer shell so as to define an intervening evacuable space; a compression-sensitive composite multi-layer insulating material in the evacuable space composed of alternating layers of a low heat conducting component and a radiant heat reflecting component; load supporting means disposed in the evacuable space consisting essentially of narrow sheets of glass fiber material in alternating sequence between layers of a minor portion of said composite multi-layer insulating material so that said minor portion is in load transmitting contact with both the inner surface of the outer shell and the outer surface of the compartment so as to transmit loads on one surface to the other surface through said minor portion of composite multi-layer insulating material, thereby minimizing compression of said major portion of composite multi-layer insulating material due to such loads, the glass fibers in said glass fiber material being oriented so that the longitudinal axes of the fibers are substantially perpendicular to the direction of heat leak into the container; and access means for introducing material to be stored in the inner compartment.

2. The insulated container of claim 1 wherein a getter material is provided in the evacuable space to maintain a vacuum in the space after it is evacuated.

3. The insulated container of claim 1 wherein palladium oxide is provided in the evacuable space to maintain a vacuum in the space after it is evacuated.

4. The insulated container of claim 1 wherein barium metal is provided in the evacuable space to maintain a vacuum in the space after it is evacuated.

5. The insulated container of claim 1 wherein a crystalline zeolitic molecular sieve gas adsorbent adapted for cooling with a cryogenic liquid as provided in the evacuable space to maintain a vacuum in the space after it is evacuated.

6. The container of claim 1 wherein the outer shell is corrugated.

7. An insulated container for storing materials at other than ambient temperatures comprising in combination an outer shell; an inner storage compartment enclosed by and spaced from the outer shell so as to define an intervening evacuable space; a composite insulating material in the evacuable space composed of (a) a radiant heat reflecting component and (b) a low heat conducting component disposed in relation to the radiant heat reflecting component so as to minimize the transfer of heat across the evacuable space through the radiant heat reflecting component by conduction, said composite insulating material serving to minimize heat transfer across the evacuable space by radiation and conduction; a plurality of solid load supporting pegs traversing the insulating space and consisting essentially of glass fiber material in which the longitudinal axes of the fibers are disposed perpendicular to the longitudinal axis of the pegs, with one end of each peg abutting the inner surface of the outer shell and with the other end of each peg abutting the adjacent outer surface of the inner compartment, said pegs serving to transmit loads on one surface to the other surface, thereby minimizing compression of the insulating material due to such loads; and access means for introducing material to be stored in the inner compartment.

8. An insulated container comprising in combination an outer shell; a liquefied gas storage compartment and a separate perishable food storage compartment both situated within the outer shell, said compartments having outer surfaces which, together with the inner surfaces of the outer shell, define an intervening continuous evacuable space therebetween; a plurality of solid load supporting pegs consisting essentially of glass fiber material in which the fibers are disposed perpendicular to the longitudinal axis of the pegs, some of said pegs being disposed between the outer shell and the liquefied gas storage compartment with one end of each peg abutting the inner surface of the outer shell and with the other end of each peg abutting the adjacent outer surface of the liquefied gas storage compartment so as to transmit loads on one surface to the other surface, some of said pegs being disposed with one end of each peg abutting the inner surface of the outer shell and with the other end abutting the adjacent outer surface of the perishable food storage compartment so as to transmit any load on one surface to the other surface and some of said pegs being disposed between the liquefied gas storage vessel and the perishable food storage compartment with one end of each peg abutting the outer surface of the liquefied gas storage compartment and the other end abutting the outer surface of the perishable food storage compartment so as to maintain the surfaces at a distance from each other equal to the length of the pegs, thereby preventing thermal contact between the surfaces; a composite insulating material composed of a radiant heat reflecting component and a low heat conducting component disposed in the evacuable space so as to minimize heat leak into the compartments and from the perishable food storage compartment to the liquefied gas storage compartment; a gas impervious, low heat conducting organic polymer strip attached at one end to the perishable food storage compartment and at the other end to an outer wall so as to define a conduit for introducing perishable food into the latter compartment; a low heating conducting sealing means to minimize heat leak into the container through the conduit; a mass of a crystalline zeolitic molecular sieve in thermal contact with the liquefied gas storage compartment and in gaseous communication with the evacuable space; a transfer conduit for transferring liquefied gas from the liquefied gas storage compartment to the perishable food storage compartment extending into the compartment, perforations in the portion of the transfer conduit within the perishable food storage compartment; a control means for regulating the transfer of liquefied gas into the perishable food storage compartment through the transfer conduit in response to the refrigeration requirements of the latter compartment; means for filling the liquefied gas storage compartment with liquefied gas and means for permitting the expansion and contraction of the outer shell and the perishable food storage compartment due to temperature changes.

9. The insulated container of claim 8 wherein the low heat conducting organic polymer strips are composed of butyl rubber.

10. The insulated container of claim 8 wherein a hinged cover plate is provided in the food storage compartment for protecting the organic polymer strips during the introduction of materials into the compartment and the removal of materials therefrom, said cover plate being rotatable about its hinge when not required for protecting the organic polymer strips.

11. A panel suitable for use in producing an insulated container, said panel comprising an outer panel wall; an inner panel wall spaced from the outer panel wall, said outer panel wall and said inner panel wall being gas-tightly joined so as to provide an evacuated insulation space therebetween; a plurality of solid load-supporting pegs consisting essentially of glass fiber material in which the longitudinal axes of the fibers are disposed perpendicular to the longitudinal axes of the pegs, one end of each peg abutting the inner surface of the outer panel and the other end of each peg abutting the adjacent outer surface of the inner panel; and a compression-sensitive insulating material disposed between the panel walls and around the pegs, said pegs being disposed and arranged in contact with only a minor portion of the surface area of the walls so as to prevent significant loads being imposed on the insulating material upon evacuation of the space between the walls.

References Cited by the Examiner
UNITED STATES PATENTS

| | | | |
|---|---|---|---|
| 2,900,800 | 8/1959 | Loveday | 62—45 |
| 2,952,987 | 9/1960 | Clauson | 62—45 |
| 3,059,114 | 10/1962 | Haettinger et al. | 62—45 X |
| 3,092,974 | 6/1963 | Haumann et al. | 62—373 X |
| 3,110,156 | 11/1963 | Ninemann | 62—45 |
| 3,139,206 | 6/1964 | Matsch | 62—45 |
| 3,158,459 | 11/1964 | Guilhem | 62—45 |

LLOYD L. KING, *Primary Examiner.*